(12) United States Patent
Mansouri et al.

(10) Patent No.: US 12,187,174 B2
(45) Date of Patent: Jan. 7, 2025

(54) STRUCTURAL ASSEMBLY FOR PASSENGER SEAT AND ASSOCIATED METHODS

(71) Applicant: Safran Seats USA LLC, Gainesville, TX (US)

(72) Inventors: Reza Mansouri, Santa Fe Springs, CA (US); Romain Tranier, Costa Mesa, CA (US)

(73) Assignee: Safran Seats USA LLC, Gainesville, TX (US)

(*) Notice: Subject to any disclaimer, the term of this patent is extended or adjusted under 35 U.S.C. 154(b) by 145 days.

(21) Appl. No.: 18/021,383

(22) PCT Filed: Mar. 5, 2021

(86) PCT No.: PCT/US2021/021155
§ 371 (c)(1),
(2) Date: Feb. 14, 2023

(87) PCT Pub. No.: WO2022/039788
PCT Pub. Date: Feb. 24, 2022

(65) Prior Publication Data
US 2023/0322138 A1    Oct. 12, 2023

Related U.S. Application Data

(63) Continuation-in-part of application No. PCT/US2020/047006, filed on Aug. 19, 2020.

(51) Int. Cl.
*B60N 2/68* (2006.01)
*B60N 2/75* (2018.01)
*B60N 3/00* (2006.01)

(52) U.S. Cl.
CPC ............ *B60N 2/682* (2013.01); *B60N 2/68* (2013.01); *B60N 2/753* (2018.02); *B60N 3/004* (2013.01)

(58) Field of Classification Search
None
See application file for complete search history.

(56) References Cited

U.S. PATENT DOCUMENTS

| | | | |
|---|---|---|---|
| 4,511,178 A | 4/1985 | Brennan | |
| 5,133,587 A * | 7/1992 | Hadden, Jr. | B60N 2/42709 297/146 |

(Continued)

FOREIGN PATENT DOCUMENTS

| | | | |
|---|---|---|---|
| CN | 108583390 A | 9/2018 | |
| CN | 111349809 A * | 6/2020 | B21C 23/02 |

(Continued)

OTHER PUBLICATIONS

Chinese Application No. 202080103265.8, Office Action mailed on Apr. 30, 2024, 9 pages (7 pages of Original Document and 2 pages of English Translation).

(Continued)

*Primary Examiner* — David E Allred
(74) *Attorney, Agent, or Firm* — Kilpatrick Townsend & Stockton LLP

(57) ABSTRACT

A structural shroud for a passenger seat assembly includes a hollow body having a first end, a second end opposite from the first end, and a central cavity between the first end and the second end. In certain embodiments, the structural shroud may include a magnesium alloy and/or an aluminum alloy, and may be formed via casting, forging, and/or additive manufacturing, among others. In some embodiments, a base frame assembly for a passenger seat assembly includes a monolithic base frame having a first leg portion and a first tube portion integrally formed with the first leg portion.

4 Claims, 9 Drawing Sheets

(56) References Cited

U.S. PATENT DOCUMENTS

| | | | |
|---|---|---|---|
| 6,179,381 B1 | 1/2001 | Gevaert | |
| 6,505,890 B2 | 1/2003 | Riley | |
| 9,365,138 B2 | 6/2016 | Mueller | |
| 2001/0006302 A1* | 7/2001 | Nagayasu | B60N 2/682 |
| | | | 297/440.15 |
| 2004/0100137 A1 | 5/2004 | Johnson | |
| 2010/0187894 A1 | 7/2010 | Kismarton et al. | |
| 2012/0091764 A1 | 4/2012 | Cailleteau et al. | |
| 2014/0375090 A1 | 12/2014 | Wegenka et al. | |
| 2016/0243638 A1* | 8/2016 | Berube | C22C 21/10 |
| 2017/0136698 A1* | 5/2017 | Kia | B29C 64/106 |
| 2017/0184086 A1* | 6/2017 | Scancarello | F04C 18/0215 |
| 2019/0047710 A1 | 2/2019 | Bell et al. | |
| 2019/0070989 A1 | 3/2019 | Klap et al. | |
| 2019/0210163 A1* | 7/2019 | Berube | B22F 10/22 |
| 2019/0299827 A1 | 10/2019 | Kinard et al. | |
| 2020/0056268 A1* | 2/2020 | Heard | C22C 21/00 |
| 2020/0147684 A1* | 5/2020 | Bowden, Jr. | B33Y 30/00 |
| 2021/0261197 A1* | 8/2021 | Czinger | B62D 29/005 |
| 2023/0294579 A1* | 9/2023 | Ziemer | B60N 2/767 |
| | | | 297/411.2 |
| 2024/0058862 A1* | 2/2024 | Dilip | B22F 10/64 |

FOREIGN PATENT DOCUMENTS

| | | |
|---|---|---|
| CZ | 2018387 A3 | 2/2020 |
| EP | 3181450 A1 | 6/2017 |
| WO | 198203366 A1 | 10/1982 |

OTHER PUBLICATIONS

International Patent Application No. PCT/US2021/021155, Invitation to Pay Additional Search Fees and Partial Search Report, dated Jun. 7, 2021.

International Patent Application No. PCT/US2021/021155, International Search Report and Written Opinion, dated Jul. 30, 2021.

* cited by examiner

STRUCTURAL ASSEMBLY FOR PASSENGER SEAT AND ASSOCIATED METHODS

REFERENCE TO RELATED APPLICATION

This application is a continuation-in-part of International Application No. PCT/US2020/047006, filed on Aug. 19, 2020 and entitled STRUCTURAL SHROUD ASSEMBLY FOR PASSENGER SEAT, the content of which is hereby incorporated by reference in its entirety.

FIELD OF THE INVENTION

The field of the invention relates to seats for passenger vehicles, and more particularly to structural assemblies for various components of such seats.

BACKGROUND

Passenger vehicles, such as aircraft, buses, trains, ships, and automobiles, include passenger seats in which passengers can be seated and otherwise use during travel. Existing passenger seats include a number of structural components at various locations on the passenger seats. For example, spreaders may serve as an interface at which various components of the passenger seat such as an armrest, seat back, table, leg assembly, etc. can be connected. This typical/traditional construction imposes limitations such as a higher part count, material waste, and compromises between optimization and manufacturability

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method of producing a spreader assembly for a passenger seat assembly includes forming an upper spreader having a central cavity extending through the upper spreader via at least one of forging or casting an aluminum alloy or a magnesium alloy into. The method includes joining the upper spreader with a lower spreader. In certain embodiments, the lower spreader is configured to receive at least one seat beam tube, and the upper spreader extends away from the lower spreader such that an end of the upper spreader is spaced apart from the lower spreader.

In some embodiments, forming includes forging or casting the aluminum alloy. In various embodiments, forming includes forging casting the magnesium alloy. In certain embodiments, forming the upper spreader includes forming at least one of a table stop or a table pivot with the upper spreader.

In various embodiments, joining the upper spreader with a lower spreader includes attaching the upper spreader to an interface of the lower spreader. In certain aspects, forming the upper spreader includes forging or casting a first shroud, forging or casting a second shroud separately from the first shroud, and joining the first shroud with the second shroud. In some cases, forming the upper spreader includes forming the upper spreader with a wall thickness of 0.40 inches. Forming the upper spreader may also include forming a secondary component with the upper spreader via additive manufacturing, and in certain cases, the secondary component includes at least one of a table stop or a table pivot. In certain aspects, the lower spreader comprises an aluminum alloy.

According to certain embodiments of the present invention, a method of producing a passenger seat assembly includes forming a structural shroud by casting or forging an aluminum alloy or a magnesium alloy into a first portion of the structural shroud and forming a second portion of the structural shroud via additive manufacturing. In some cases, the second portion includes a lattice structure. The method also includes joining the structural shroud with a secondary component of the passenger seat assembly.

In some embodiments, the structural shroud is an upper spreader, the secondary component is a lower spreader configured to receive at least one seat beam tube. Joining the structural shroud with the secondary component may include attaching the structural shroud to the lower spreader such that the structural shroud extends away from the lower spreader such that an end of the upper spreader is spaced apart from the lower spreader. In some cases, forming the structural shroud includes forming the structural shroud with a central cavity extending through the structural shroud. In various embodiments, the structural shroud is an armrest, and the secondary component is a spreader.

According to certain embodiments of the present invention, a structural shroud for a passenger seat assembly includes a hollow body having a first end, a second end opposite from the first end, and a central cavity between the first end and the second end. A wall thickness of the structural shroud may be less than 0.08 inches, and the structural shroud may include a magnesium alloy.

In certain embodiments, at least a portion of the structural shroud includes a lattice structure. In various aspects, the structural shroud is an upper spreader that is connectable with a lower spreader that is configured to receive at least one seat beam tube. In some cases, the wall thickness is 0.04 inches. In various embodiments, the structural shroud is an armrest. In some cases, a secondary component is integral with the structural shroud, and the secondary component includes at least one of a table pivot or a table stop.

According to certain embodiments of the present invention, a method of forming a passenger seat includes monolithically forming a first base frame that includes a first leg portion and a first tube portion. The method also includes monolithically forming a second base frame with a second leg portion and a second tube portion. The method may include joining the first base frame with the second base frame, and joining the first base frame with the second base frame forms a base frame assembly of the passenger seat.

In some embodiments, monolithically forming the first base frame includes casting a magnesium alloy into the first base frame, and monolithically forming the second base frame includes casting a magnesium alloy into the second base frame. In various cases, the first leg portion extends from the first tube portion in a vertical direction, the first tube portion is elongated in a horizontal direction, the second leg portion extends from the second tube portion in the vertical direction, and the second tube portion is elongated in the horizontal direction.

In various embodiments, joining the first tube portion of the first base frame with the second tube portion of the second base frame includes joining the first tube portion with the second tube portion. Monolithically forming the first base frame may include monolithically forming the first monolithic base frame with a third tube portion such that the leg portion extends in a vertical direction from both the first tube portion and the third tube portion and such that the third tube portion is offset from the first tube portion in an aft direction.

In certain embodiments, monolithically forming the first base frame includes monolithically forming a spreader portion with the first tube portion and the third tube portion. The spreader portion may extend from the first tube portion and the third tube portion at a location that is offset from the first leg portion. In some embodiments, monolithically forming the first base frame includes monolithically forming at least one of a base leg portion, a strut leg portion, a bracket roller, a bracket diaphragm, or a bracket inflator with the first tube portion and the first leg portion.

According to certain embodiments of the present invention, a monolithic base frame for a passenger seat includes a leg portion and a tube portion integrally formed with the leg portion. The leg portion extends from the tube portion in a vertical direction, and the tube portion is elongated in a horizontal direction.

In some embodiments, the tube portion is a first tube portion, and the base frame further comprises a second tube portion integrally formed with the leg portion. The second tube portion may be offset from the first tube portion in an aft direction. In certain aspects, at least one spreader portion is integrally formed with the first tube portion and the second tube portion, and the at least one spreader portion may be offset from the leg portion.

In various embodiments, the at least one spreader portion includes a first spreader portion and a second spreader portion integrally formed with the first tube portion and the second tube portion, and the leg portion may be between the first spreader portion and the second spreader portion. The monolithic base frame may also include at least one of a bracket inflator, a bracket diaphragm, or a bracket roller integrally formed with the tube portion. In certain cases, the leg portion includes a first leg, a second leg, and a base leg extending between the first leg and the second leg, and the base leg is integrally formed with the first leg and the second leg.

According to certain embodiments of the present invention, a passenger seat includes a base frame assembly with a first monolithic base frame and a monolithic second base frame. The first monolithic base frame includes a first leg portion and a first tube portion integrally formed with the first leg portion. The first leg portion extends from the first tube portion in a vertical direction, and the first tube portion is elongated in a horizontal direction. The monolithic second base frame includes a second leg portion and a second tube portion integrally formed with the second leg portion. The second leg portion extends from the second tube portion in the vertical direction, and the second tube portion is elongated in the horizontal direction. In various embodiments, the first monolithic base frame is attached to the monolithic second base frame to form the base frame assembly. The base frame assembly is configured to support a seat back of the passenger seat.

In some embodiments, the passenger seat also includes the seat back, and the seat back may be pivotably connected to the base frame assembly such that the seat back is pivotable relative to the base frame assembly. In some cases, the first monolithic base frame is attached to the monolithic second base frame such that the first tube portion is connected to the second tube portion. In various embodiments, the first monolithic base frame is attached to the monolithic second base frame such that the second tube portion is offset from the first tube portion in an aft direction.

In certain embodiments, the first monolithic base frame includes a third tube portion integrally formed with the first leg portion that is offset from the first tube portion in an aft direction. The monolithic base frame tube may also include at least one spreader portion integrally formed with the first tube portion and the third tube portion, and the at least one spreader portion may be offset from the leg portion.

In various aspects, the first monolithic base frame includes at least one of a bracket inflator, a bracket diaphragm, or a bracket roller integrally formed with the tube portion. In some cases, the first leg portion includes a first leg, a second leg, and a base leg extending between the first leg and the second leg, and the base leg is integrally formed with the first leg and the second leg.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide structural assemblies having a structural shroud for passenger seats. The structural assemblies include but are not limited to spreaders, armrests, and in-flight entertainment shrouds. While the structural assemblies are discussed for use with aircraft seats, they are by no means so limited. Rather, embodiments of the structural assemblies may be used in passenger seats or other seats of any type or otherwise as desired.

Figure 1:
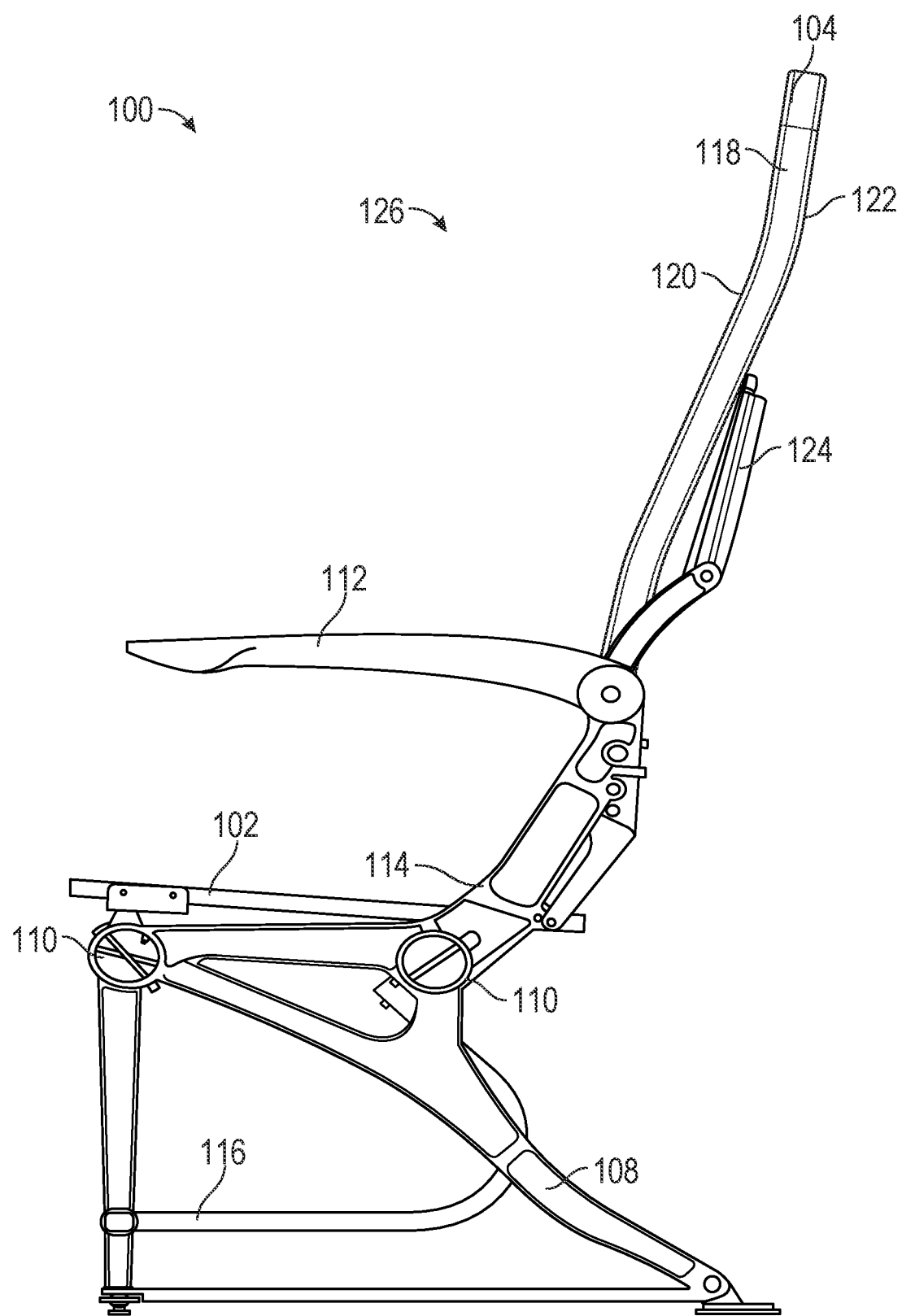
FIG. 1 is a side view of a passenger seat according to certain embodiments of the present invention.

As illustrated in FIG. 1, a passenger seat assembly 100 may include a seat base frame assembly 102 and one or more seat backs 104 supported relative to the seat base frame assembly 102. The number of seat backs 104 should not be considered limiting on the disclosure. In various examples, the number of seat backs 104 correspond with the number of passengers that the passenger seat is capable of carrying, and each seat back 104 and the corresponding portion of the seat base frame assembly 102 define a particular passenger seat 126. In the example of FIG. 1, the passenger seat assembly 100 is capable of carrying one passenger, and accordingly has one seat back 104 and one passenger seat 126. However, in other examples, the passenger seat assembly 100 may be capable of carrying any desired number of passengers, such as one passenger, two passengers, three passengers, four passengers, or any other desired number of passengers. In these examples, the passenger seat assembly 100 can likewise have any desired number of corresponding seat backs 104.

The seat base frame assembly 102 of the passenger seat assembly 100 generally includes a leg assembly 108 and at least one base frame tube 110. The seat base frame assembly 102 may also include a support frame 106, an armrest 112, a spreader 114, a luggage bar 116, or other components. Cushioning (not illustrated) may be provided on any of the components of the seat base frame assembly 102.

The seat back 104 is connected to the seat base frame assembly 102, and is often pivotable relative to the seat base frame assembly 102 such that the seat back 104 can be positioned in various positions such as a taxi-takeoff-landing (TTL) position, a reclined position, etc. In certain aspects, the seat back 104 is connected to the seat base frame assembly 102 via the spreader 114. The seat back 104 includes a frame component 118 having a forward side 120 and an aft side 122. In some cases, other components of the passenger seat assembly 100 such as a tray table 124, an in-flight entertainment monitor, or various other components may be supported on and/or relative to the seat back 104. In certain cases, other components, such as the tray table 124 may be pivotably connected to the spreader 114, and the tray table 124 may be movable relative to the aft side 122 of the seat back 104 between a stowed position and a deployed position. Cushioning (not illustrated) may be provided on any of the components of the seat back 104.

Various structural assemblies of the seat base frame assembly 102 and/or the seat back 104 may be subjected to different types of loads or forces when used. As one non-limiting example, with the spreader 114, a lower portion of the spreader 114 (e.g., the portion that engages the base frame tube(s) 110) may be subjected to pulling loads or forces during use, and an upper portion of the spreader 114 (e.g., the portion that connects with the seat back 104) may be subjected to pushing loads during use. Other structural assemblies of the seat base frame assembly 102 and/or the seat back 104 include, but are not limited to armrests and in-flight entertainment shrouds. In certain aspects, and as discussed in detail below, one or more of the structural assemblies may include a structural shroud.

Figure 2:
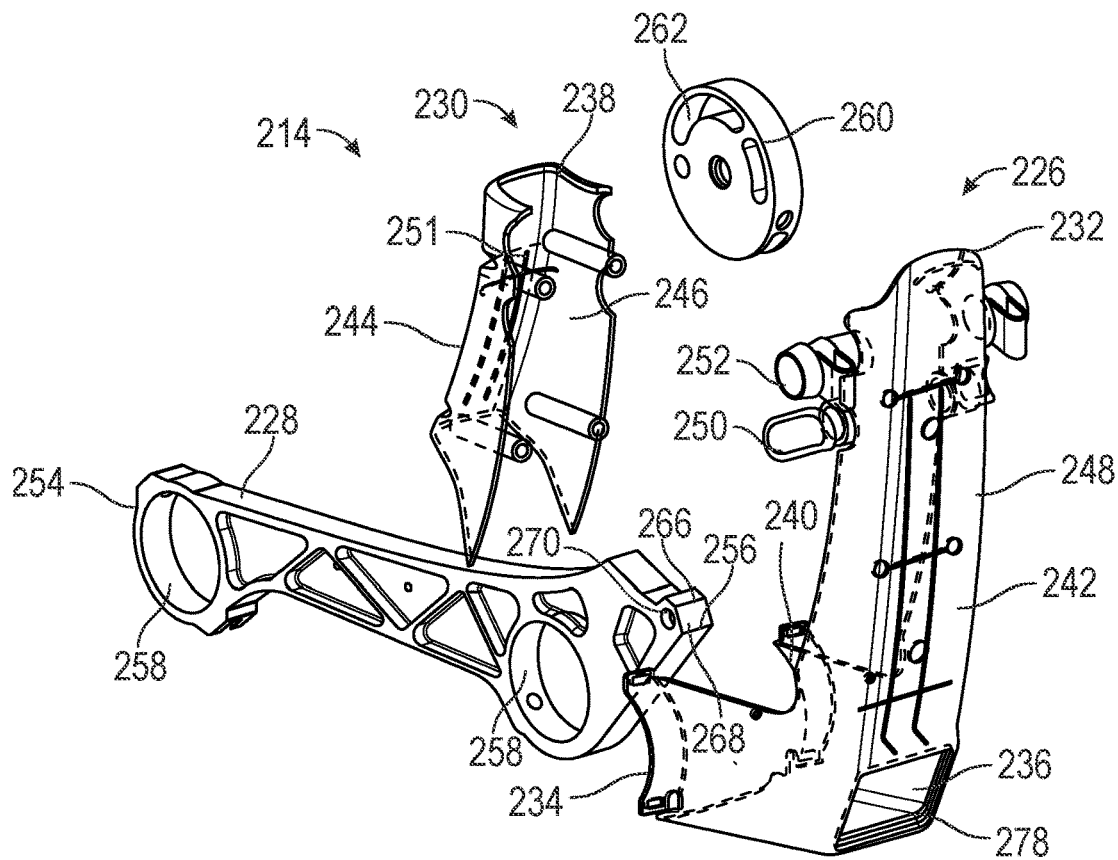
FIG. 2 is an exploded view of a spreader assembly according to certain embodiments of the present invention.
Figure 3:
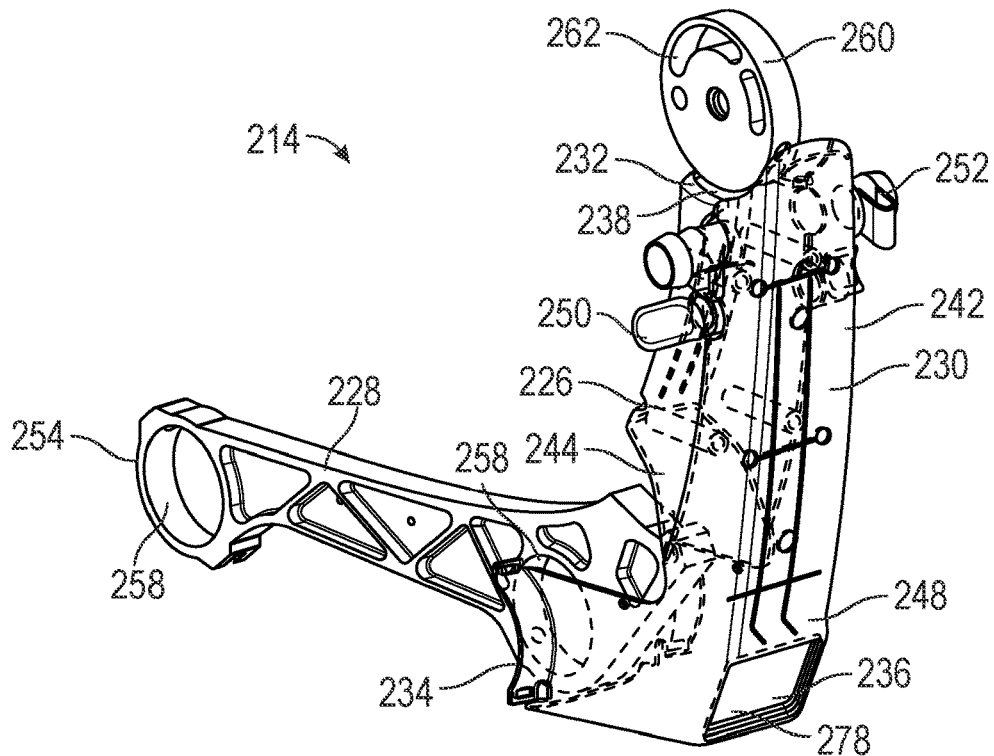
FIG. 3 is a perspective view of the spreader assembly of FIG. 2.

FIGS. 2 and 3 illustrate an example of a spreader assembly 214 having an upper spreader 226 and a lower spreader 228. Similar to the spreader 114, the spreader assembly 214 is configured to connect a seat back with the seat base frame assembly as well as support various other components such as a tray table. In various embodiments, and as discussed below, the upper spreader 226 is configured to engage with and/or support a seat back of the passenger seat and/or other components such as a tray table and may be subject to pushing loads during use, and the lower spreader 228 is configured to engage with the base frame tube(s) 110 and may be subject to pulling loads during use.

In various embodiments, the upper spreader 226 is a structural shroud 230 having a first end 232 and a second end 234 opposite from the first end 232. The particular shape of the structural shroud 230 should not be considered limiting on the disclosure. The structural shroud 230 also has an inner surface 246 and an outer surface 248 extending from the first end 232 to the second end 234. As illustrated in FIGS. 2 and 3, the inner surface 246 defines a central cavity 236 such that the structural shroud 230 is hollow along a length of the structural shroud 230. In other words, a cross-sectional shape of the structural shroud 230 may have a hollow center due to the central cavity 236. In various examples, at least one of the first end 232 or the second end 234 defines an opening providing access to the central cavity 236. In the embodiment of FIGS. 2 and 3, the first end 232 includes a first opening 238 providing access to the central cavity 236 and the second end 234 includes a second opening 240 providing access to the central cavity 236. Optionally, an intermediate opening 278 between the first end 232 and the second end 234 providing access to the central cavity 236. In some non-limiting examples, a component of the passenger seat assembly, including but not limited to a power outlet, USB outlet, or other amenity or component of the passenger seat may be provided in the intermediate opening 278. In certain aspects, the first end 232 may be a top-most portion of the assembled upper spreader 226 and lower spreader 228. In some embodiments, a stiffener or reinforcing component 251 may optionally be provided on the structural shroud 230. The stiffener or reinforcing component 251 may be provided on the inner surface 246 and/or the outer surface 248 as desired, and may stiffen the structural shroud 230. In various embodiments, the stiffener or reinforcing component 251 may be a separate component attached to the structural shroud or may be integrally formed with the structural shroud.

In some embodiments, the structural shroud 230 includes a first shroud 242 and a second shroud 244 connected to the first shroud 242. In various cases, the first shroud 242 may be connected to the second shroud 244 via various suitable devices or mechanisms as desired such that the second shroud 244 may be selectively removed from the first shroud 242 (e.g., to allow greater access to the central cavity 236. As one non-limiting example, the second shroud 244 may be removably connected to the first shroud 242 via mechanical fasteners such that cabling or wiring or other features within the central cavity 236 may be accessed as desired. The structural shroud 230 may be constructed from various suitable materials, including but not limited to aluminum, aluminum alloys, magnesium, magnesium alloys, stainless steel, aramid fibers, polycarbonate, polypropylene, other metallic materials including alloys, composite materials, or other similar materials. In one non-limiting example, the structural shroud 230 is constructed from a reinforced plastic such as a sheet molding compound. In another non-limiting example, the structural shroud 230 is formed from an aluminum or an aluminum alloy. In one non-limiting example, the structural shroud 230 may be a 7xx.x series cast aluminum alloy, although in other embodiments other aluminum alloys may be utilized as desired (e.g., a 1xx.x series cast aluminum alloy, a 2xx.x series cast aluminum alloy, a 3xx.x series cast aluminum alloy, a 4xx.x series cast aluminum alloy, a 5xx.x series cast aluminum alloy, a 6xx.x series cast aluminum alloy, an 8xx.x series cast aluminum alloy, and/or a 9xx.x series cast aluminum alloy). In another non-limiting example, the structural shroud 230 is constructed from magnesium or a magnesium alloy. In one non-limiting example, the structural shroud 230 is constructed from magnesium alloy WE43-T5, although in other embodiments other magnesium alloys may be utilized as desired.

The structural shroud 230 may be constructed via various forming techniques as desired. In some embodiments, the structural shroud 230 is constructed from techniques including, but not limited to, injection molding, vacuum forming, forging, casting, additive manufacturing, machining, combinations thereof, or other techniques as desired. In one non-limiting embodiment, the structural shroud 230 may be formed via a combination of casting or forging and additive manufacturing. In various aspects, the structural shroud 230 is integrally or monolithically formed as a single component. In other aspects, the first shroud 242 and the second shroud 244 may each be integrally formed as single components that are joined together via various suitable mechanisms, devices, or techniques as desired. In some embodiments, integrally forming the structural shroud 230 (or the first shroud 242 and the second shroud 244) may allow for various components that are typically separate components to be integrally formed with the shroud itself, thereby providing a part and/or weight reduction to the passenger seat assembly. As some non-limiting examples, a table pivot 250 and/or a table stop 252 may be integrally formed with the structural shroud 230. Various other components for the passenger seat may be integrally formed with the structural shroud 230 as desired.

In some embodiments, the structural shroud 230 disclosed herein optionally may have a reduced wall thickness compared to existing structures, thereby providing weight reduction to the overall passenger seat assembly. As some non-limiting examples, the wall thickness of the structural shroud 230 may be less than or equal to about 0.080 inches, such as less than or equal to about 0.060 inches, such as about 0.040 inches. In other embodiments, the structural shroud 230 may have various other wall thicknesses as desired.

As illustrated in FIGS. 2 and 3, the lower spreader 228 includes a forward end 254 and an aft end 256 opposite of the forward end 254. The particular shape of the lower spreader 228 should not be considered limiting on the disclosure. Compared to the upper spreader 226, the lower spreader 228 does not include an inner surface extending along a length of the lower spreader and/or a central cavity. In other words, a cross-sectional shape of the lower spreader 228 may be different from that of the upper spreader 226. In some non-limiting embodiments, a center of the cross-sectional shape of the lower spreader 228 may be solid other than locations with apertures for the base frame tube(s) (discussed below). In certain aspects, the forward end 254 may be a forward-most portion of the spreader assembly 214. In various aspects, the aft end 256 may be an aft-most portion and/or a lowermost portion of the spreader assembly 214, although it need not be the aft-most and/or the lowermost portion. In the example of FIGS. 2 and 3, a portion of the upper spreader 226 extends aft of the aft end 256. In other embodiments, the lower spreader 228 may be a structural shroud similar to the structural shroud 230 and may define a central cavity such that the lower spreader 228 is hollow. In such embodiments, the lower spreader 228 may be a separate component that is connected to the upper spreader 226 via various suitable connectors or connecting mechanisms as desired, or the lower spreader 228 and the upper spreader 226 may be formed as a monolithic or integral component.

In various embodiments, the lower spreader 228 includes one or more apertures 258 defined through a thickness of the lower spreader 228 between the forward end 254 and the aft end 256 that receive and engage base frame tube(s) of the passenger seat assembly. In the embodiment of FIGS. 2 and 3, the lower spreader 228 includes two apertures 258. In other embodiments, or other suitable interfacing for the base frame tube(s) may be provided. The lower spreader 228 may also include interfacing for other components of the seat base of the passenger seat assembly as desired. The lower spreader 228 may be constructed from various materials as desired suitable for engaging the base frame tube(s) and the upper spreader 226.

The upper spreader 226 may be connected to the lower spreader 228 proximate to the second end 234. In various examples, the lower spreader 228 may include an interface 266 that may be used to connect the upper spreader 226 with the lower spreader 228. As best illustrated in FIG. 2, in the embodiment of FIGS. 2 and 3, the interface 266 includes a ridge 268 having a securing aperture 270. Various other types of interfaces 266 may be utilized as desired, and the ridge 268 and/or securing aperture 270 need not be included. In some cases, the lower spreader 228 may be partially received within the central cavity 236, although it need not in other examples (see, e.g., FIG. 4). The upper spreader 226 may be connected to the lower spreader 228 via various suitable devices or mechanisms as desired, including but not limited to mechanical fasteners.

In some cases, connectors and/or other components that engage with features of the seat back may optionally be provided on the structural shroud 230 and extend outwards from the outer surface 248. Such connectors and/or other components may be connected to the structural shroud 230 via various suitable mechanisms or devices as desired, or they may be integrally or monolithically formed with the structural shroud 230. In the embodiment of FIGS. 2 and 3, the structural shroud 230 includes a table pivot 250 and a table stop 252 integrally formed with the structural shroud 230.

Optionally, and as illustrated in FIGS. 2 and 3, the spreader assembly 214 includes an armrest pivot 260 supported proximate to the first end 232 of the upper spreader 226. The armrest pivot 260 may connected to the upper spreader 226 via various suitable devices or mechanisms as desired. In certain aspects, the armrest pivot 260 includes one or more pivot grooves 262 that may interface with an armrest such that the armrest is pivotable relative to the spreader assembly 214.

The spreader assembly 214, which may be referred to as a "split" spreader assembly, may be advantageous over traditional spreaders. In one aspect, the split spreader assembly 214 may maximize the inertia of the upper spreader 226 and reduce the mass needed to achieve the required stiffness to withstand forces from the armrest, seat back, etc. The split spreader assembly 214 may also optionally reduce the number of parts required for a spreader by embedding one or more of the components (e.g., stiffener, table stops, pivots, etc.), into the structural shroud. In some cases, the split spreader assembly 214 may reduce the amount of material waste that is caused by the typical crescent shape of traditional spreaders. The split spreader assembly 214 may also optimize stiffness and strength requirements for portion that engages the armrest, seat back, etc. independently from the stiffness and strength requirements for the portion that engages the base frame tube(s) and needing to withstand 16G loads.

Figure 4:
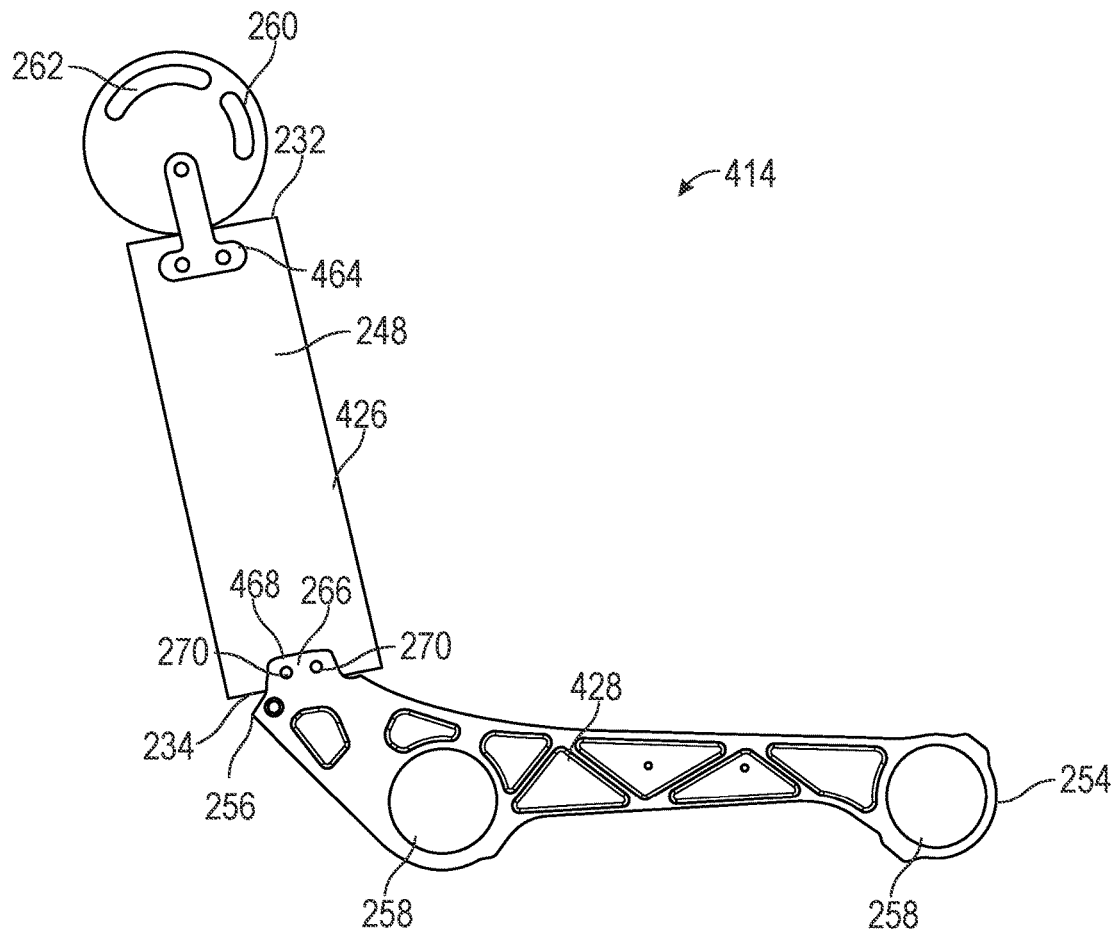
FIG. 4 is a side view of a spreader assembly according to certain embodiments of the present invention.
Figure 5:
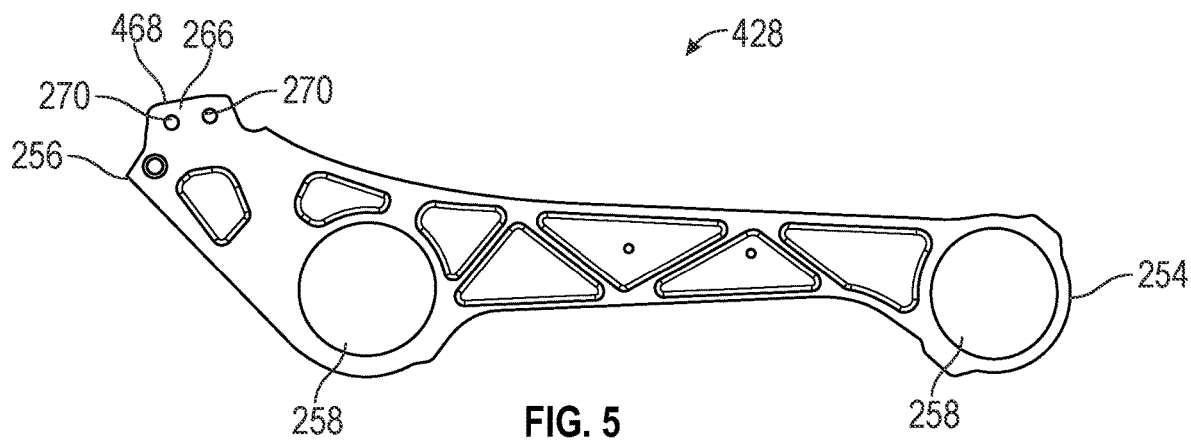
FIG. 5 is a side view of a lower spreader of the spreader assembly of FIG. 4.

FIGS. 4 and 5 illustrate another embodiment of a spreader assembly 414 that is substantially similar to the spreader assembly 214 and includes an upper spreader 426 and a lower spreader 428. The upper spreader 426 is similar to the upper spreader 226 and includes a structural shroud 430. Compared to the upper spreader 226, the structural shroud 430 of the upper spreader 426 has a different shape than the structural shroud 230, and the structural shroud 430 is a monolithic and does not include the first shroud 242 and the second shroud 244. As illustrated in FIG. 4, an interface component 464 may connect the armrest pivot 260 with the upper spreader 426. The lower spreader 428 is substantially similar to the lower spreader 428 except that the interface 266 includes a ridge 468 having two securing apertures 270.

Figure 6:
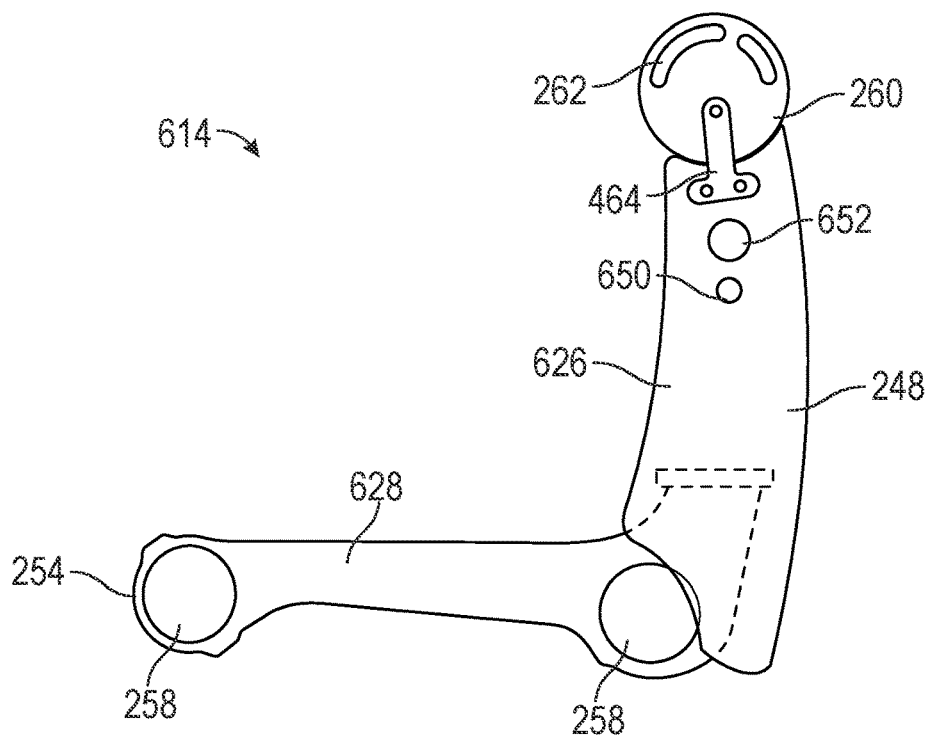
FIG. 6 is a side view of a spreader assembly according to certain embodiments of the present invention.
Figure 7:
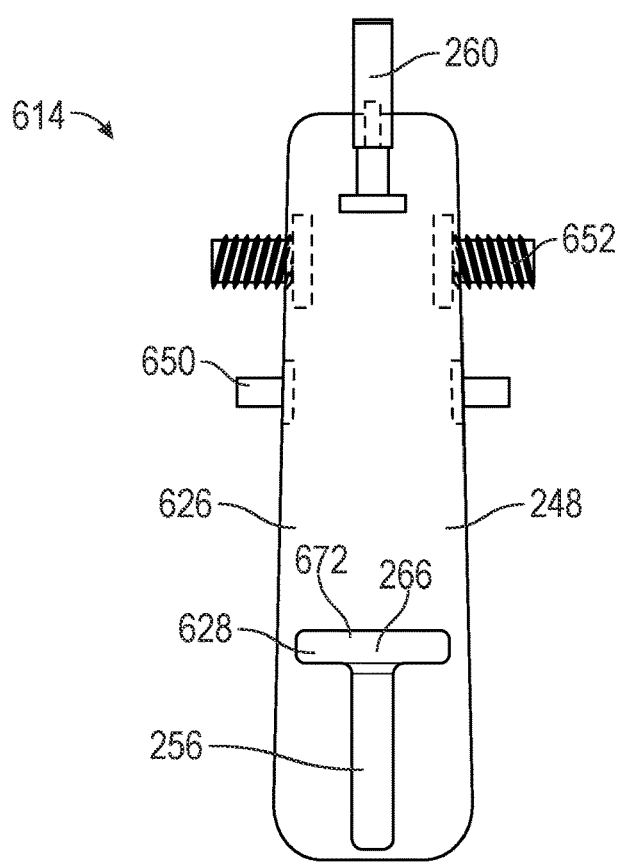
FIG. 7 is a rear view of the spreader assembly of FIG. 6.

FIGS. 6 and 7 illustrate another embodiment of a spreader assembly 614 that is substantially similar to the spreader assembly 214 and includes an upper spreader 626 and a lower spreader 628. The upper spreader 626 is similar to the upper spreader 226 and includes a structural shroud 630. Compared to the upper spreader 226, the structural shroud 630 of the upper spreader 626 has a different shape than the structural shroud 230, and the structural shroud 630 is a monolithic and does not include the first shroud 242 and the second shroud 244. The lower spreader 428 is substantially similar to the lower spreader 428 except that the interface 266 includes a ledge 672 that engages the upper spreader 626 and secures the lower spreader 628 to the upper spreader 626 without requiring separate fasteners or other joining devices. Compared to the spreader assembly 214, a table pivot 650 and a table stop 652 are separate components from the structural shroud 630 that are supported on the structural shroud 630.

Figure 8:
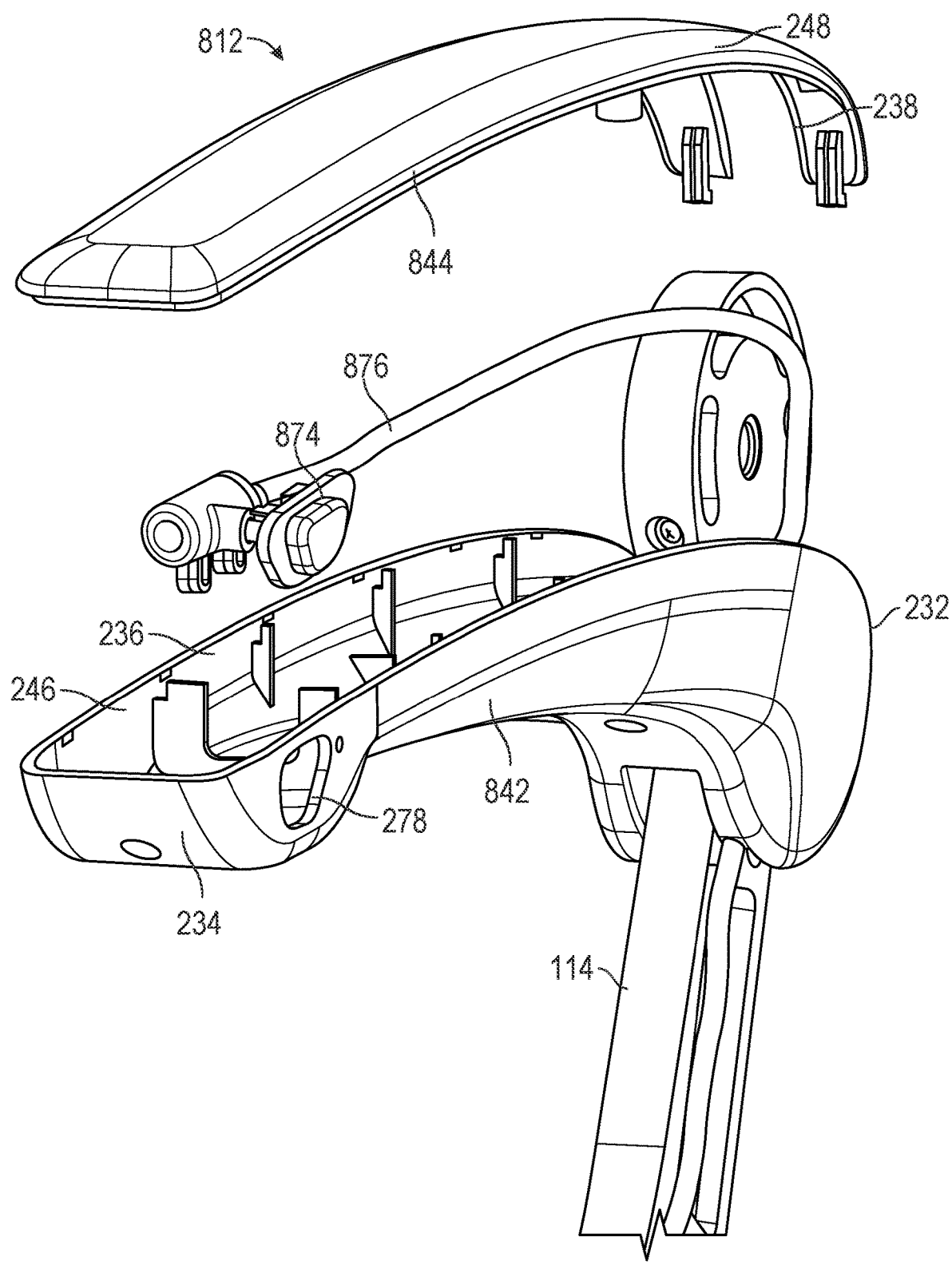
FIG. 8 is an exploded view of an armrest assembly according to certain embodiments of the present invention.

FIG. 8 illustrates an example of an armrest 812 having a structural shroud 830 according to various embodiments. Similar to the structural shroud 230, the structural shroud 830 includes a first shroud 842 and a second shroud 844. Compared to the structural shroud 230, the second end 234 of the structural shroud 830 does not include second opening 240. In the embodiment of FIG. 8, the intermediate opening 278 is configured to receive an actuator 874 of the armrest 812, and cabling 876 for the actuator 874 may be housed within the central cavity 236.

Figure 9:
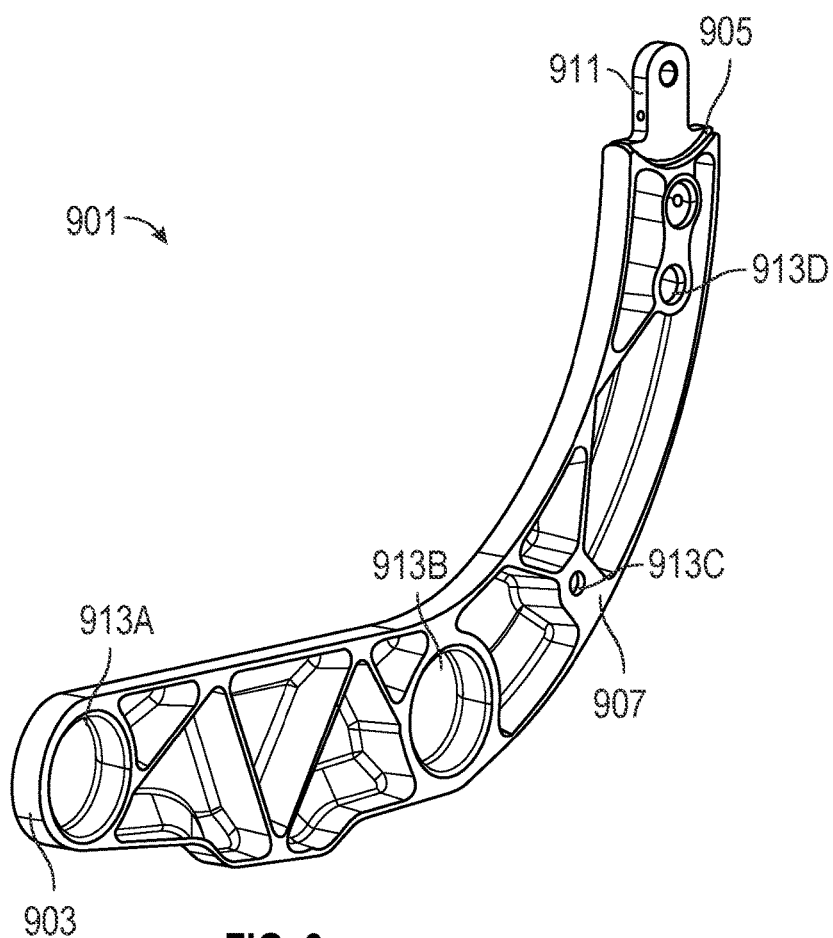
FIG. 9 is a perspective view of another spreader according to certain embodiments of the present invention.
Figure 10:
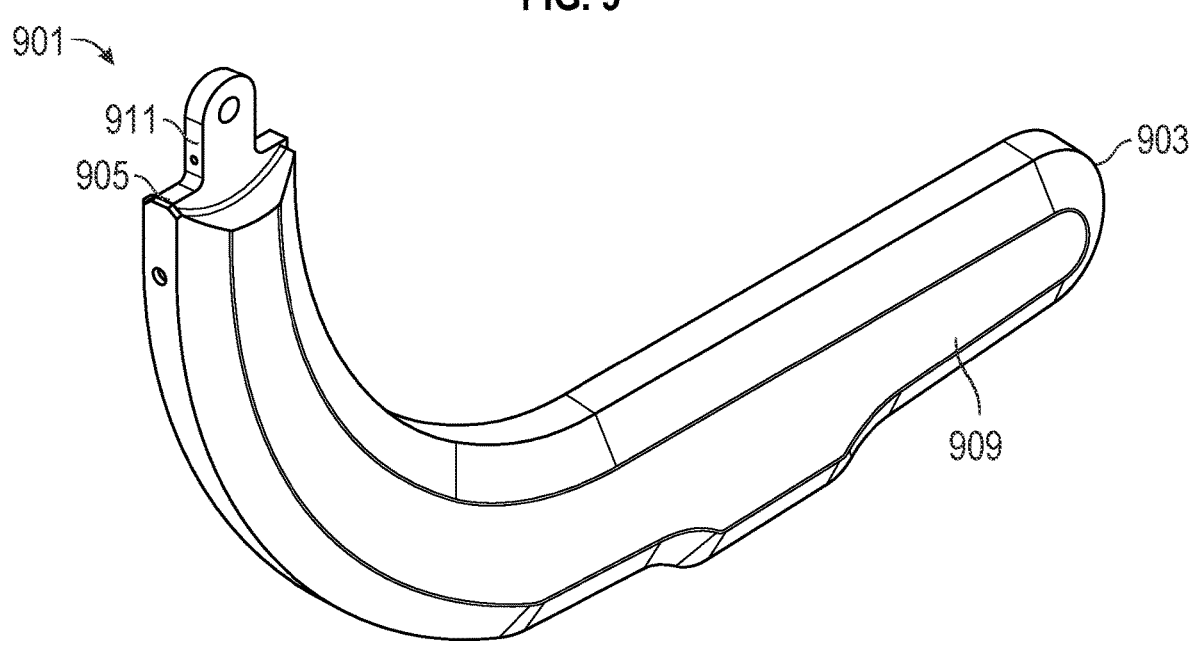
FIG. 10 is another perspective view of the spreader of FIG. 9.

FIGS. 9 and 10 illustrate a monolithic or integral spreader 901 according to various embodiments. In certain embodiments, the spreader 901 may be an aisle spreader that is configured to interface with an end of one or more base frame (or structural) tubes. In certain embodiments, the spreader 901 is integrally formed via casting or forging a metallic material including but not limited to aluminum, an aluminum alloy, magnesium, or a magnesium alloy. As illustrated in FIGS. 9 and 10, the spreader 901 includes a first end 903, a second end 905, a first face 907, and a second face 909. In certain embodiments, the second end 905 may include a mounting feature 911 integrally formed with the spreader 901. When a passenger seat is assembled with the spreader 901, various features may be coupled to the spreader 901 via the mounting feature 911, including but not limited to an armrest.

As best illustrated in FIG. 9, in certain embodiments, the first face 907 includes one or more locating recesses and/or anchor points 913A-C that may interface with other components of the passenger seat assembly. The number, shape, size, and location of the locating recesses 913A-D should not be considered limiting on the disclosure. In certain embodiments, the locating recesses 913A-B are configured to interface with base frame tubes of the passenger seat assembly, and the locating recesses and/or anchor points 913C-D are configured to interface with additional structures of the passenger seat. As one non-limiting example, anchor point 913C may be an attachment point for a seat belt of the passenger seat. As best illustrated in FIG. 10, compared to the first face 907, the second face 909 may omit the locating recesses 913A-D. In certain embodiments, when a passenger seat is assembled with the spreader 901, the second face 909 may be an outermost face of the passenger seat assembly.

Figure 11:
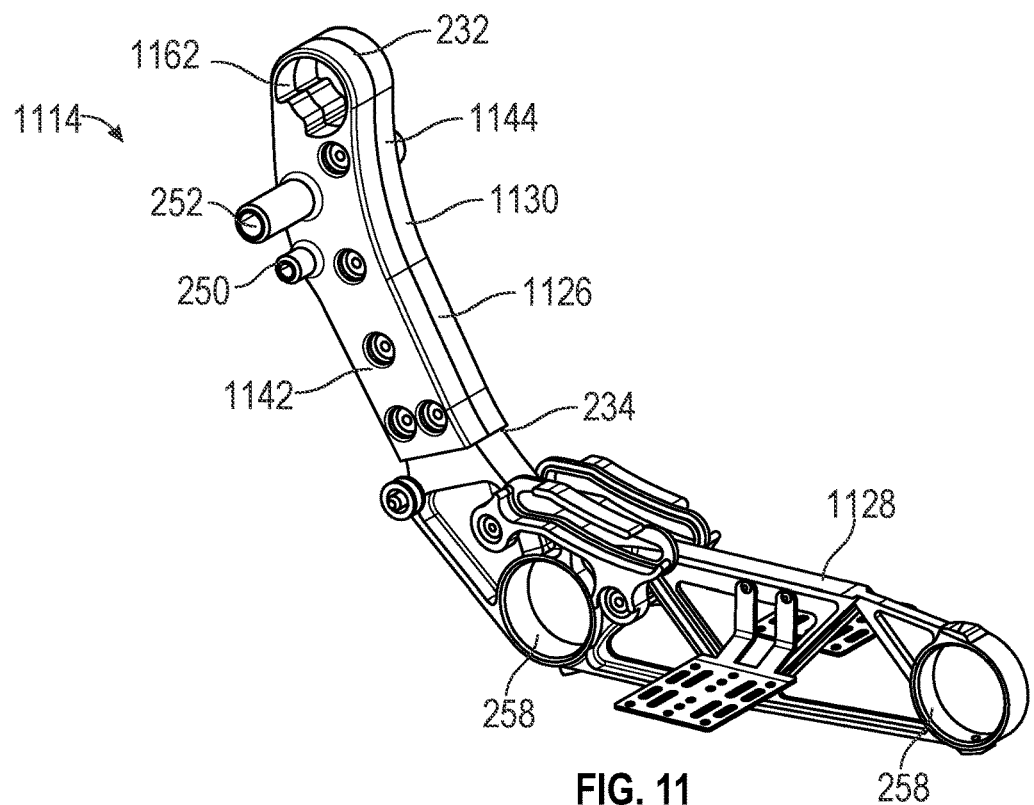
FIG. 11 is a perspective view of another spreader according to certain embodiments of the present invention.
Figure 12:
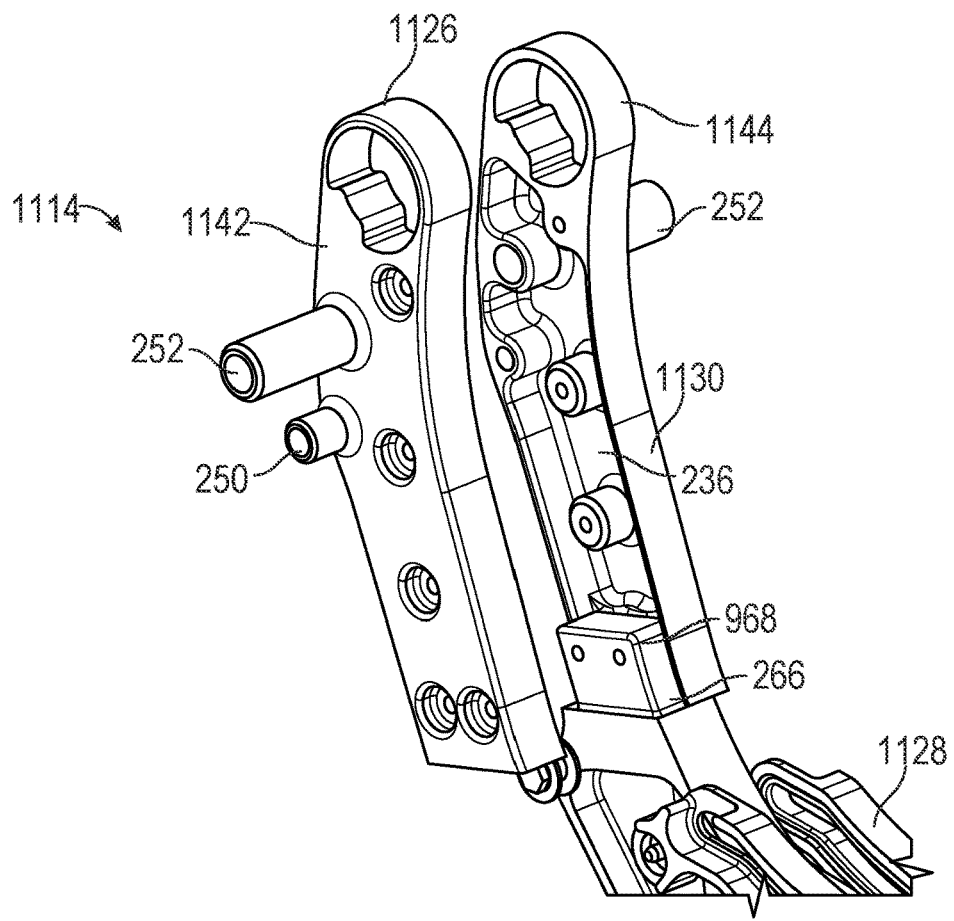
FIG. 12 is another perspective view of the spreader of FIG. 11.

FIGS. 11 and 12 illustrate another embodiment of a spreader assembly 1114 according to various embodiments. The spreader assembly 1114 is similar to the spreader assembly 214 and includes an upper spreader 1126 and a lower spreader 1128. The lower spreader 1128 is substantially similar to the lower spreader 228 except that the lower spreader 1128 has a different shape or profile and a ridge 968 of the user interface 266 has a different profile or shape compared to the ridge 268.

The upper spreader 1126 is similar to the upper spreader 226 and includes a structural shroud 1130 having a first shroud 1140 and a second shroud 1142. Compared to the upper spreader 226, where the first shroud 242 and the second shroud 240 were joined in a forward and aft direction, the first shroud 1140 and the second shroud 1142 are joined in a side-to-side direction. Compared to the upper spreader 226, the upper spreader 1126 also omits the opening 238 (i.e., the upper spreader 1126 only includes the second opening 240). In addition, compared to the upper spreader 226, the armrest pivot 1162 is integrally formed with the structural shroud 1126. In the embodiment of FIGS. 11 and 12, the table pivot 250 and/or table stop 252 are formed integrally or monolithically with each of the first shroud 1140 and the second shroud 1142. In various embodiments, the first shroud 1140 and/or the second shroud 1142 are integrally or monolithically formed via casting or molding and may include aluminum, an aluminum alloy, magnesium, or a magnesium alloy, and the first shroud 1140 and the second shroud 1142 are joined via fastening mechanisms such as screws, adhesives, bolts, pins, hooks, and other suitable mechanisms as desired. In other embodiments, the first shroud 1140 and/or the second shroud 1142 may be formed via other techniques as desired, may be constructed from various other materials as desired, and may be joined via other techniques as desired. In other embodiments, the structural shroud 1130 may be formed as a single integral or monolithic component.

Figure 13:
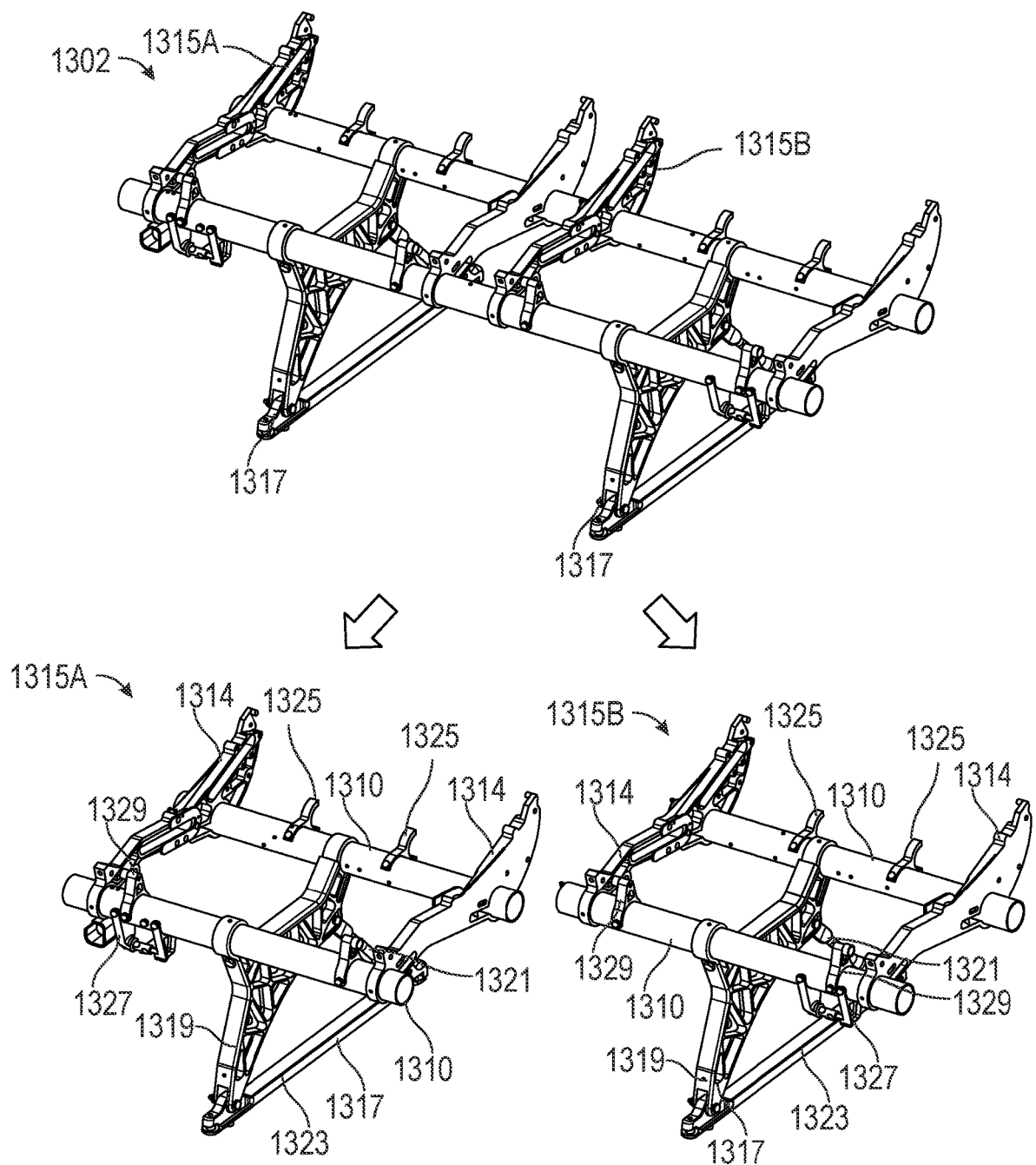
FIG. 13 illustrates a base frame assembly according to certain embodiments of the present invention.

FIG. 13 illustrates an embodiment of a base frame assembly 1302 according to certain embodiments of the present invention. Compared to the base frame assembly 102, the base frame assembly 1302 includes a first monolithic base frame 1315A and a second monolithic base frame 1315B that are joined together to form the base frame assembly 1302.

The following description will make references to the first monolithic base frame 1315A, but the description is equally applicable to the second monolithic base frame 1315B unless stated otherwise. Optionally, the second monolithic base frame 1315B may be mirrored with respect to the first monolithic base frame 1315A, although it need not be in other embodiments. The first monolithic base frame 1315A is monolithically or integrally formed via various techniques including but not limited to casting, forging, and/or additive manufacturing. In some embodiments, the first monolithic base frame 1315A is constructed from a metallic material including but not limited to include aluminum, an aluminum alloy, magnesium, or a magnesium alloy. In one non-limiting embodiment, the first monolithic base frame 1315A is formed by casting or forging magnesium or a magnesium alloy.

As illustrated in FIG. 13, the first monolithic base frame 1315A includes a leg portion 1317 that is monolithically or integrally formed with at least one tube portion 1310. In the embodiment of FIG. 13, the leg portion 1317 is monolithically or integrally formed with two tube portions 1310. In embodiments with more than on tube portion 1310, one tube portion 1310 the leg portion 1317 extends from both the tube portions 1310 and such one tube portion 1310 is forward (or aft) compared to the other tube portion 1310. The leg portion 1317 extends in a vertical direction, and the tube portions 1310 are elongated in a horizontal direction In addition to the leg portion 1317 and the at least one tube portion 1310, the first monolithic base frame 1315A may optionally include one or more additional features integrally formed with the leg portion 1317 and the at least one tube portion 1310. In certain embodiments, the first monolithic base frame 1315A includes at least one spreader portion 1314 integrally formed with the tube portion(s) 1310. A seat back may optionally be attached to the at least one spreader portion 1314. In the embodiment of FIG. 13, the first monolithic base frame 1315A includes two spreader portions 1314. In embodiments where the first monolithic base frame 1315A includes more than one tube portion 1310, the at least one spreader portion 1314 may extend from the tube portions 1310 at a location that is offset from the leg portion 1317. In embodiments where the first monolithic base frame 1315A includes more than one spreader portion 1314, the leg portion 1317 may optionally be between adjacent spreader portions 1314.

In certain embodiments, the leg portion 1317 optionally includes a first leg 1319, a second leg 1321, and a base leg extending 1323 extending between the first leg 1319 and the second leg 1321. Optionally, the first monolithic base frame 1315A may additional and/or fewer portions integrally formed with the leg portion 1317, the tube portion(s) 1310, and/or other portions as desired. Other integrally formed features may include, but are not limited to, a bracket inflator portion 1325, a bracket diaphragm portion 1327, and/or a bracket roller portion 1329 integrally formed with the tube portion(s) 1310.

In certain embodiments, forming the base frame assembly 1302 may include joining one tube portion 1310 of the first monolithic base frame 1315A with a corresponding tube portion 1310 of the second monolithic base frame 1315B. Joining the tube portions 1310 may include joining via various suitable techniques or mechanisms including but not limited to welding, mechanical fasteners, adhesives, combinations thereof, or other mechanisms as desired. In other embodiments, the base frame assembly 1302 may be formed by joining and/or otherwise connecting other portions of the monolithic base frames 1315A-B.

Figure 14:
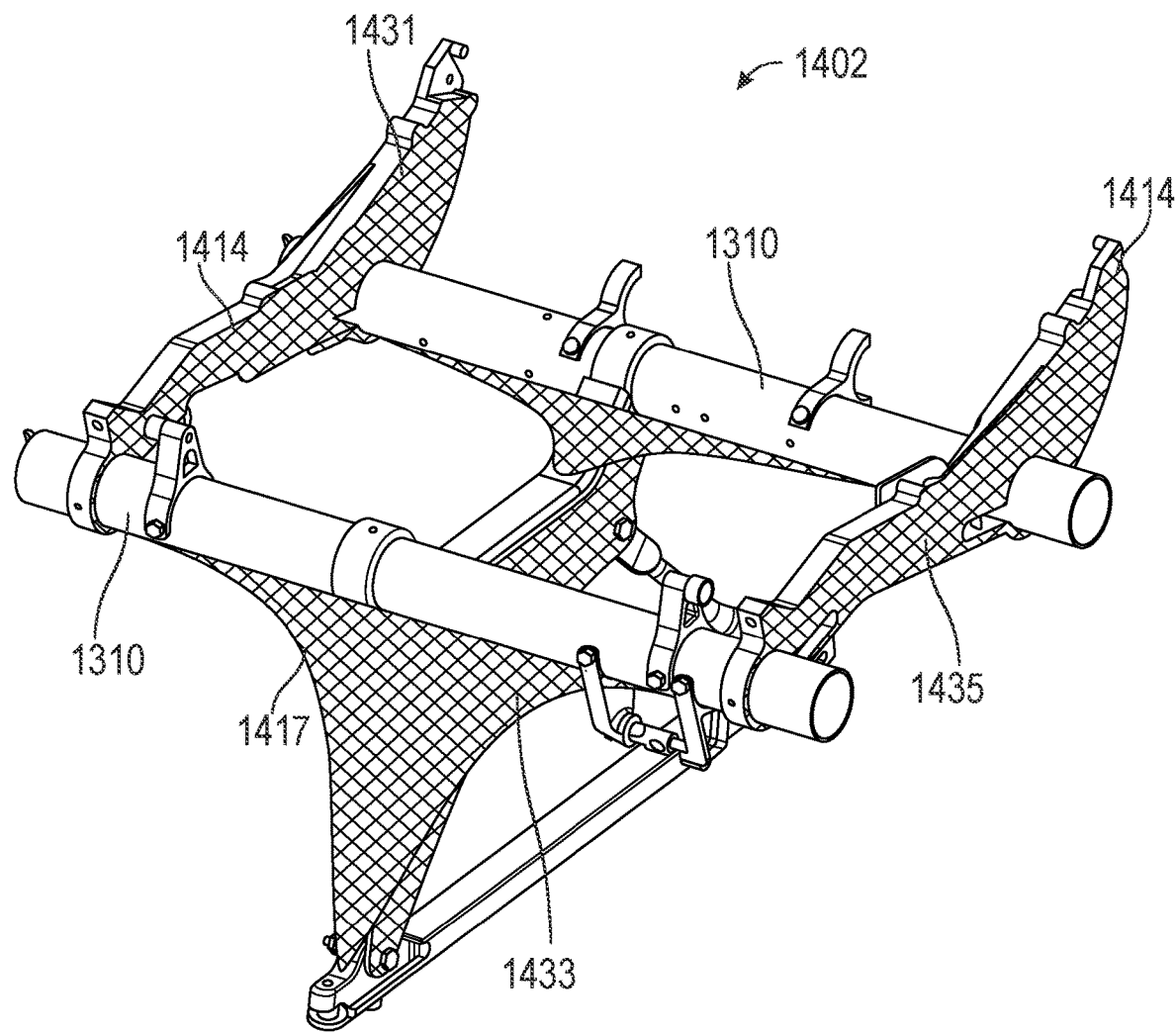
FIG. 14 is a side view of a base frame assembly according to certain embodiments of the present invention.

FIG. 14 illustrates base frame assembly 1402 according to various embodiments. The base frame assembly 1402 is substantially similar to the base frame assembly 1302 in that it is monolithically or integrally formed. Compared to the base frame assembly 1302, the base frame assembly 1402 includes a leg portion 1417 and a spreader portion 1414 that is formed via additive manufacturing and the tube portions 1310 that are formed via casting or forging. As illustrated in FIG. 14, the leg portion 1417 and spreader portion 1414 include a lattice network 1431. While illustrated as a uniform lattice network 1431 (e.g., struts 1433 and openings 1435 of the lattice networks 1431 are uniformly shaped and sized), in other embodiments, the lattice network 1431 need not be uniform, and the lattice network 1431 may have areas with increased struts 1433/reduced openings 1435 (e.g., to increase structural performance of the area) and/or areas with increased openings 1435/reduced struts 1433 (e.g., to provide weight savings and/or if a portion does not require a particular structural performance). The base frame assembly 1402 may include other features or components similar to those discussed with respect to the base frame assembly 1302.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A method of producing a spreader assembly for a passenger seat assembly, the method comprising: forming an upper spreader comprising a central cavity extending through the upper spreader via at least one of forging or casting an aluminum alloy or a magnesium alloy into; and joining the upper spreader with a lower spreader, wherein the lower spreader is configured to receive at least one seat beam tube, and wherein the upper spreader extends away from the lower spreader such that an end of the upper spreader is spaced apart from the lower spreader.

Illustration 2. The method of any preceding or subsequent illustrations or combination of illustrations, wherein forming comprises forging or casting the aluminum alloy.

Illustration 3. The method of any preceding or subsequent illustrations or combination of illustrations, wherein forming comprises forging casting the magnesium alloy.

Illustration 4. The method of any preceding or subsequent illustrations or combination of illustrations, wherein forming the upper spreader comprises forming at least one of a table stop or a table pivot with the upper spreader.

Illustration 5. The method of any preceding or subsequent illustrations or combination of illustrations, wherein joining the upper spreader with a lower spreader comprises attaching the upper spreader to an interface of the lower spreader.

Illustration 6. The method of any preceding or subsequent illustrations or combination of illustrations, wherein forming the upper spreader comprises forging or casting a first shroud, forging or casting a second shroud separately from the first shroud, and joining the first shroud with the second shroud.

Illustration 7. The method of any preceding or subsequent illustrations or combination of illustrations, wherein forming the upper spreader comprises forming the upper spreader with a wall thickness of 0.40 inches.

Illustration 8. The method of any preceding or subsequent illustrations or combination of illustrations, wherein forming the upper spreader further comprises forming a secondary component with the upper spreader via additive manufacturing.

Illustration 9. The method of any preceding or subsequent illustrations or combination of illustrations, wherein the secondary component comprises at least one of a table stop or a table pivot.

Illustration 10. The method of any preceding or subsequent illustrations or combination of illustrations, wherein the lower spreader comprises an aluminum alloy.

Illustration 11. A method of producing a passenger seat assembly, the method comprising: forming a structural shroud by casting or forging an aluminum alloy or a magnesium alloy into a first portion of the structural shroud and forming a second portion of the structural shroud via additive manufacturing, wherein the second portion comprises a lattice structure; and joining the structural shroud with a secondary component of the passenger seat assembly.

Illustration 12. The method of any preceding or subsequent illustrations or combination of illustrations, wherein the structural shroud is an upper spreader, wherein the secondary component is a lower spreader configured to receive at least one seat beam tube, and wherein joining the structural shroud with the secondary component comprises attaching the structural shroud to the lower spreader such that the structural shroud extends away from the lower spreader such that an end of the upper spreader is spaced apart from the lower spreader.

Illustration 13. The method of any preceding or subsequent illustrations or combination of illustrations, wherein forming the structural shroud comprises forming the structural shroud with a central cavity extending through the structural shroud.

Illustration 14. The method of any preceding or subsequent illustrations or combination of illustrations, wherein the structural shroud is an armrest, and wherein the secondary component is a spreader.

Illustration 15. A structural shroud for a passenger seat assembly, the structural shroud comprising a hollow body comprising a first end, a second end opposite from the first end, and a central cavity between the first end and the second end, wherein a wall thickness of the structural shroud is less than 0.08 inches, and wherein the structural shroud comprises a magnesium alloy.

Illustration 16. The structural shroud of any preceding or subsequent illustrations or combination of illustrations, wherein at least a portion of the structural shroud comprises a lattice structure.

Illustration 17. The structural shroud of any preceding or subsequent illustrations or combination of illustrations, wherein the structural shroud is an upper spreader that is connectable with a lower spreader that is configured to receive at least one seat beam tube.

Illustration 18. The structural shroud of any preceding or subsequent illustrations or combination of illustrations, wherein the wall thickness is 0.04 inches.

Illustration 19. The structural shroud of any preceding or subsequent illustrations or combination of illustrations, wherein the structural shroud is an armrest.

Illustration 20. The structural shroud of any preceding or subsequent illustrations or combination of illustrations, wherein a secondary component is integral with the structural shroud, and wherein the secondary component comprises at least one of a table pivot or a table stop.

Illustration 21. A method of forming a passenger seat, the method comprising: monolithically forming a first base frame, wherein the first monolithic base frame comprises a first leg portion and a first tube portion; monolithically forming a second base frame, wherein the monolithic second base frame comprises a second leg portion and a second tube portion; and joining the first base frame with the second base frame, wherein joining the first base frame with the second base frame forms a base frame assembly of the passenger seat.

Illustration 22. The method of any preceding or subsequent illustrations or combination of illustrations, wherein monolithically forming the first base frame comprises casting a magnesium alloy into the first base frame, and wherein monolithically forming the second base frame comprises casting a magnesium alloy into the second base frame.

Illustration 23. The method of any preceding or subsequent illustrations or combination of illustrations, wherein the first leg portion extends from the first tube portion in a vertical direction, wherein the first tube portion is elongated in a horizontal direction, wherein the second leg portion extends from the second tube portion in the vertical direction, and wherein the second tube portion is elongated in the horizontal direction.

Illustration 24. The method of any preceding or subsequent illustrations or combination of illustrations, wherein joining the first tube portion of the first base frame with the second tube portion of the second base frame comprises joining the first tube portion with the second tube portion.

Illustration 25. The method of any preceding or subsequent illustrations or combination of illustrations, wherein monolithically forming the first base frame comprises monolithically forming the first monolithic base frame with a third tube portion, wherein the leg portion extends in a vertical direction from both the first tube portion and the third tube portion, wherein the third tube portion is offset from the first tube portion in an aft direction.

Illustration 26. The method of any preceding or subsequent illustrations or combination of illustrations, wherein monolithically forming the first base frame comprising monolithically forming a spreader portion with the first tube portion and the third tube portion, wherein the spreader portion extends from the first tube portion and the third tube portion at a location that is offset from the first leg portion.

Illustration 27. The method of any preceding or subsequent illustrations or combination of illustrations, wherein monolithically forming the first base frame comprises monolithically forming at least one of a base leg portion, a strut leg portion, a bracket roller, a bracket diaphragm, or a bracket inflator with the first tube portion and the first leg portion.

Illustration 28. A monolithic base frame for a passenger seat, the monolithic base frame comprising a leg portion and a tube portion integrally formed with the leg portion, wherein the leg portion extends from the tube portion in a vertical direction, and wherein the tube portion is elongated in a horizontal direction.

Illustration 29. The monolithic base frame of any preceding or subsequent illustrations or combination of illustrations, wherein the tube portion is a first tube portion, and wherein the base frame further comprises a second tube portion integrally formed with the leg portion, wherein the second tube portion is offset from the first tube portion in an aft direction.

Illustration 30. The monolithic base frame of any preceding or subsequent illustrations or combination of illustrations, further comprising at least one spreader portion integrally formed with the first tube portion and the second tube portion, wherein the at least one spreader portion is offset from the leg portion.

Illustration 31. The monolithic base frame of any preceding or subsequent illustrations or combination of illustrations, wherein the at least one spreader portion comprises a first spreader portion and a second spreader portion integrally formed with the first tube portion and the second tube portion, wherein the leg portion is between the first spreader portion and the second spreader portion.

Illustration 32. The monolithic base frame of any preceding or subsequent illustrations or combination of illustrations, further comprising at least one of a bracket inflator, a bracket diaphragm, or a bracket roller integrally formed with the tube portion.

Illustration 33. The monolithic base frame of any preceding or subsequent illustrations or combination of illustrations, wherein the leg portion comprises a first leg, a second leg, and a base leg extending between the first leg and the second leg, wherein the base leg is integrally formed with the first leg and the second leg.

Illustration 34. A passenger seat comprising a base frame assembly, the base frame assembly comprising: a first monolithic base frame comprising a first leg portion and a first tube portion integrally formed with the first leg portion, wherein the first leg portion extends from the first tube portion in a vertical direction, and wherein the first tube portion is elongated in a horizontal direction; and a monolithic second base frame comprising a second leg portion and a second tube portion integrally formed with the second leg portion, wherein the second leg portion extends from the second tube portion in the vertical direction, and wherein the second tube portion is elongated in the horizontal direction, wherein the first monolithic base frame is attached to the monolithic second base frame to form the base frame assembly, and wherein the base frame assembly is configured to support a seat back of the passenger seat.

Illustration 35. The passenger seat of any preceding or subsequent illustrations or combination of illustrations, further comprising the seat back, wherein the seat back is pivotably connected to the base frame assembly such that the seat back is pivotable relative to the base frame assembly.

Illustration 36. The passenger seat of any preceding or subsequent illustrations or combination of illustrations, wherein the first monolithic base frame is attached to the monolithic second base frame such that the first tube portion is connected to the second tube portion.

Illustration 37. The passenger seat of any preceding or subsequent illustrations or combination of illustrations, wherein the first monolithic base frame is attached to the monolithic second base frame such that the second tube portion is offset from the first tube portion in an aft direction.

Illustration 38. The passenger seat of any preceding or subsequent illustrations or combination of illustrations, wherein the first monolithic base frame further comprises: a third tube portion integrally formed with the first leg portion, wherein the third tube portion is offset from the first tube portion in an aft direction; and at least one spreader portion integrally formed with the first tube portion and the third tube portion, wherein the at least one spreader portion is offset from the leg portion.

Illustration 39. The passenger seat of any preceding or subsequent illustrations or combination of illustrations, wherein the first monolithic base frame further comprises at least one of a bracket inflator, a bracket diaphragm, or a bracket roller integrally formed with the tube portion.

Illustration 40. The passenger seat of any preceding or subsequent illustrations or combination of illustrations, wherein the first leg portion comprises a first leg, a second leg, and a base leg extending between the first leg and the second leg, wherein the base leg is integrally formed with the first leg and the second leg.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of producing a passenger seat assembly, the method comprising:
   forming a structural shroud by casting or forging an aluminum alloy or a magnesium alloy into a first portion of the structural shroud and forming a second portion of the structural shroud via additive manufacturing, wherein the second portion comprises a lattice structure; and
   joining the structural shroud with a secondary component of the passenger seat assembly;
   wherein the first and second portions, at least partially, surround the secondary component with the first portion on one side of the secondary component and the second portion on another side opposite the one side.

2. The method of claim 1, wherein the structural shroud is an upper spreader, wherein the secondary component is a lower spreader configured to receive at least one seat beam tube, and wherein joining the structural shroud with the secondary component comprises attaching the structural shroud to the lower spreader such that the structural shroud extends away from the lower spreader such that an end of the upper spreader is spaced apart from the lower spreader.

3. The method of claim 1, wherein forming the structural shroud comprises forming the structural shroud with a central cavity extending through the structural shroud.

4. The method of claim 1, wherein the structural shroud is an armrest, and wherein the secondary component is a spreader.

* * * * *